United States Patent
Ketcha et al.

(10) Patent No.: US 11,657,518 B2
(45) Date of Patent: May 23, 2023

(54) METHOD FOR DEFORMABLE 3D-2D REGISTRATION USING MULTIPLE LOCALLY RIGID REGISTRATIONS

(71) Applicant: The Johns Hopkins University, Baltimore, MD (US)

(72) Inventors: Michael Ketcha, Baltimore, MD (US); Wathudurage Tharindu deSilva, Baltimore, MD (US); Ali Uneri, Baltimore, MD (US); Jean-Paul Wolinsky, Towson, MD (US); Jeffrey H. Siewerdsen, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/741,782

(22) Filed: May 11, 2022

(65) Prior Publication Data
US 2022/0270271 A1   Aug. 25, 2022

Related U.S. Application Data

(63) Continuation of application No. 16/291,012, filed on Mar. 4, 2019, now abandoned, which is a
(Continued)

(51) Int. Cl.
*G06T 7/33* (2017.01)

(52) U.S. Cl.
CPC ...... *G06T 7/33* (2017.01); *G06T 2207/10081* (2013.01); *G06T 2207/10088* (2013.01);
(Continued)

(58) Field of Classification Search
CPC ............. G06T 7/33; G06T 2207/10081; G06T 2207/10088; G06T 2207/10104;
(Continued)

(56) References Cited

U.S. PATENT DOCUMENTS

| 7,840,093 B2 | 11/2010 | Fu et al. |
| 2007/0165917 A1 | 7/2007 | Cao et al. |
| 2008/0247622 A1* | 10/2008 | Aylward ............ A61B 90/36 382/131 |
| 2016/0005192 A1 | 1/2016 | Royalty et al. |

OTHER PUBLICATIONS

Mclaughlin et al., "A comparison of a similarity-based and a feature-based 2-D-3-D registration method for neurointerventional use", Medical Imaging, IEEE Transactions on, (2005), vol. 24, No. 8, pp. 1058-1066.

(Continued)

*Primary Examiner* — Siamak Harandi
(74) *Attorney, Agent, or Firm* — Venable LLP; Henry J. Daley; Aziz H. Poonawalla

(57) ABSTRACT

An embodiment in accordance with the present invention provides a method for 3D-2D registration (for example, registration of a 3D CT image to a 2D radiograph) that permits deformable motion between structures defined in the 3D image based on a series of locally rigid transformations. This invention utilizes predefined annotations in 3D images (e.g., the location of anatomical features of interest) to perform multiple locally rigid registrations that yield improved accuracy in aligning structures that have undergone deformation between the acquisition of the 3D and 2D images (e.g., a preoperative CT compared to an intraoperative radiograph). The 3D image is divided into subregions that are masked according to the annotations, and the registration is computed simultaneously for each divided region by incorporating a volumetric masking method within the 3D-2D registration process.

24 Claims, 9 Drawing Sheets

Related U.S. Application Data continuation of application No. 15/381,494, filed on Dec. 16, 2016, now Pat. No. 10,262,424.

(60) Provisional application No. 62/269,371, filed on Dec. 18, 2015.

(52) U.S. Cl.
CPC ........... *G06T 2207/10104* (2013.01); *G06T 2207/10116* (2013.01); *G06T 2207/20221* (2013.01); *G06T 2207/30012* (2013.01)

(58) Field of Classification Search
CPC ........... G06T 2207/10116; G06T 2207/20221; G06T 2207/30012
See application file for complete search history.

(56) References Cited

OTHER PUBLICATIONS

Otake et al., "Automatic localization of vertebral levels in x-ray fluoroscopy using 3D-2D registration: a tool to reduce wrong-site surgery", Physics in Medicine and Biology, (2012), vol. 57, No. 17.

Otake et al., "3D-2D registration in mobile radiographs: algorithm development and preliminary clinical evaluation" Physics in Medicine and Biology, (2015), vol. 60, No. 5.

Lo et al., "Automatic Localization of Target Vertebrae in Spine Surgery: Clinical Evaluation of the Level Check Registration Algorithm", Spine, (2015), vol. 40, No. 8.

Schmid et al., "Segmentation of X-ray images by 3D-2D Registration Based on Multibody Physics" In Computer Vision—ACCV 2, (2014), pp. 674-687, Springer International Publishing.

Zhu et al., "A new diamond search algorithm for fast block-matching motion estimation", Image Processing, EEE Transactions, (2000), vol. 9, No. 2, pp. 287-290.

Ourselin et al., "Block matching: A general framework to improve robustness of rigid registration of medical images", In Medical Image Computing and Computer-Assisted Intervention—MICCAI 2000, (Jan. 2000), pp. 557-566, Springer Berlin Heidelberg.

Varnavas et al., "Increasing the automation of a 2D-3D registration system", Medical Imaging, IEEE Transactions, (2013), vol. 32, No. 2, pp. 387-399.

Varnavas et al., "Fully Automated 2D-3D Registration and Verification" Medical Image Analysis, (2015).

Ketcha et al., "Automatic Masking for Robust 3D-2D Image Registration in Image-Guided Spine Surgery" Proc. SPIE Medical Imaging (2016).

* cited by examiner

6-DOF Transform

Point cloud of annotation 1's projected location using each of the four 6-DOF outputs. Note that, as expected, the projection using the 6-DOF transform for annotation 2 projects to a similar location as annotation 1.

US 11,657,518 B2

METHOD FOR DEFORMABLE 3D-2D REGISTRATION USING MULTIPLE LOCALLY RIGID REGISTRATIONS

CROSS REFERENCE TO RELATED APPLICATIONS

This application is a Continuation of U.S. patent application Ser. No. 16/291,012, filed Mar. 4, 2019, which is a Continuation of U.S. patent application Ser. No. 15/381,494, filed Dec. 16, 2016, now U.S. Pat. No. 10,262,424, issued Apr. 16, 2019, which claims the benefit of U.S. Provisional Patent Application No. 62/269,371 filed Dec. 18, 2015, which is incorporated by reference herein, in its entirety.

FIELD OF THE INVENTION

The present invention relates generally to imaging. More particularly the present invention relates to a method for deformable registration of 3D image information with a single 2D image (referred to as 3D-2D registration) using multiple locally rigid registrations.

BACKGROUND OF THE INVENTION 3D preoperative imaging (e.g., CT, MRI, PET) provides the basis for many forms of surgical planning and intraoperative guidance. During the surgical planning stage, clinicians may define geometric annotations (points, contours, shapes, etc.) in the preoperative 3D images, such as defining a point on an anatomical structure of interest, outlining relevant anatomical structures, and identifying the desired placement/trajectory of surgical hardware. These annotations can be incorporated into the surgical process using, for example, via a mechanism using various algorithms for rigid/deformable registration (aligning physical coordinate systems to create a "mapping" from one coordinate system to another). In the context of surgical guidance, it is often useful to create such a mapping between the 3D preoperative images and the 2D intraoperative images (e.g., x-ray radiographic/fluoroscopy systems). This is referred to as 3D-2D image registration. This mapping then enables the annotations defined in the 3D image to be overlaid onto the 2D image, providing decision support for the clinician as well as a means for verification of the surgical product.

There are previously established methods to achieve 3D-2D image registration that map preoperative 3D images to the space of the 2D image—for example, mapping a preoperative CT image onto the corresponding coordinates in a 2D projection intraoperative x-ray radiograph. In principle, such registration methods can be categorized as: 1) intensity-based and/or 2) feature-based. In intensity-based registration, the voxel values (i.e., image "intensity" value in the 3D image) and the pixel values (i.e., the image "intensity" values in the 2D image) are used directly in comparison of similarity and alignment; on the other hand, in feature-based registration, the registration is performed using a set of features (usually point sets, contours, and/or surfaces) extracted from one or both of the images.

3D-2D registration is potentially valuable in medical interventions, such as surgery and radiation therapy. For example, in spine surgery, the "LevelCheck" method uses 3D-2D registration to map vertebral level locations that have been defined in the preoperative CT onto 2D radiographic images. This registration assists the surgeon during target localization by identifying specific vertebral levels, and provides advantages in terms of time, dose, and accuracy compared to manual level counting.

In applications such as accurate vertebral level localization, in addition to the preoperative and intraoperative images, there are annotations defined within the 3D preoperative image (e.g., a label defined on each vertebra in the 3D image), and the goal of 3D-2D registration is to map the location of such annotations to the 2D image. Thus, in these applications, registration is intended to map the annotation locations rather than physically aligning the entire content captured in the images. Accordingly, the performance of the registration process can be quantified in terms of the accuracy of mapping each annotation.

Existing methods for image-intensity-based 3D-2D annotation mapping have used a rigid transformation and can be limited by deformation in anatomy. These deformations occur commonly due to differences in patient positioning between the preoperative acquisition and intraoperative acquisition during surgery. Other sources of deformation include patient motion, breathing, or the procedure itself—e.g., correction of spinal curvature. For example, 3D images are often acquired when the patient is lying in a supine position (on the CT scanner table), whereas surgery often requires the patient to lie in a prone position (on the OR table). This results in a deformation of anatomy, including the structures of interest in surgery (e.g., the spinal vertebrae). Because the patient anatomy presented in the 2D image is deformed with respect to the 3D image, a single rigid transformation between the 3D and 2D space does not describe the complexity of motion, and the accuracy of annotation mapping can be degraded. Deformable image registration could improve accuracy in these scenarios, but such methods are susceptible to local optima and often fail due to a large number of parameters being optimized and an inherent degeneracy between magnification and object enlargement. Piece-wise rigid registration methods exist in feature-based registration to account for these deformations; however, segmentations or shape models need to be extracted from the 3D image to perform the registration, creating additional work in planning, introducing sources of error in segmentation, and often disregarding potentially relevant image intensity information.

It would therefore be advantageous to provide a solution that accomplishes a globally deformable registration of annotated structures from the 3D image to the 2D space. This invention describes a method for accomplishing such globally deformable registration of annotations by way of multiple locally rigid registrations.

SUMMARY OF THE INVENTION

The foregoing needs are met, to a great extent, by the present invention, wherein in one aspect a method of performing a 3D to 2D registration of 3D image data to 2D image data includes identifying predefined annotations in the 3D image data. The method includes performing locally rigid registrations in a hierarchical manner to achieve a mapping of information from the 3D image to the 2D image that is globally deformable with respect to the locations of the annotated features. The method also includes dividing the image into divided regions according to the annotations. Additionally, the method includes determining the registration for each divided region by using a volumetric masking method and displaying the registration of the information from the 3D image data to the 2D image data.

In accordance with an embodiment of the present invention, the method includes using anatomical features of interest as the predefined annotations. The method includes performing the registration with 3D image data from a computed tomography scan and 2D image data from a radiograph and using preoperative 3D image data and intraoperative 2D image data. The method includes generating a display that is globally deformable with respect to the predetermined annotations. A different transform can be applied to each feature to account for deformable motion. Additionally, the method can be programmed and executed on a non-transitory computer readable medium.

In accordance with yet another aspect of the present invention, a system for 3D-2D registration includes an image scanner configured to obtain three-dimensional (3D) image data. The system also includes a non-transitory computer readable medium programmed to execute a method. The method includes performing locally rigid registrations in a hierarchical manner to achieve a mapping of information from the 3D image to the 2D image that is globally deformable with respect to the locations of the annotated features. The method also includes dividing the image into divided regions according to the annotations. Additionally, the method includes determining the registration for each divided region by using a volumetric masking method and displaying the registration of the information from the 3D image data to the 2D image data.

In accordance with still another aspect of the present invention, the system further includes displaying the predefined annotations from the 3D image data on the 2D image. The system includes using anatomical features of interest as the predefined annotations. The system includes performing the registration with 3D image data from a computed tomography or MM scan and 2D image data from a radiograph. The system includes using preoperative 3D image data and intraoperative 2D image data. The system includes generating a display that is globally deformable with respect to the predetermined annotations. The system also includes applying a different transform to each feature to account for deformable motion. The system can include a CT scanner configured to obtain three-dimensional images. Additionally the system includes using a multi-stage registration process incorporating a set of intensity-based 3D-2D rigid registrations and registering a six degree-of-freedom transformation output comprising three dimensions of translation and three dimensions of rotation.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIGS. 7A-7J illustrate image views of an exemplary implementation of the present invention.

DETAILED DESCRIPTION

Figure 1A:
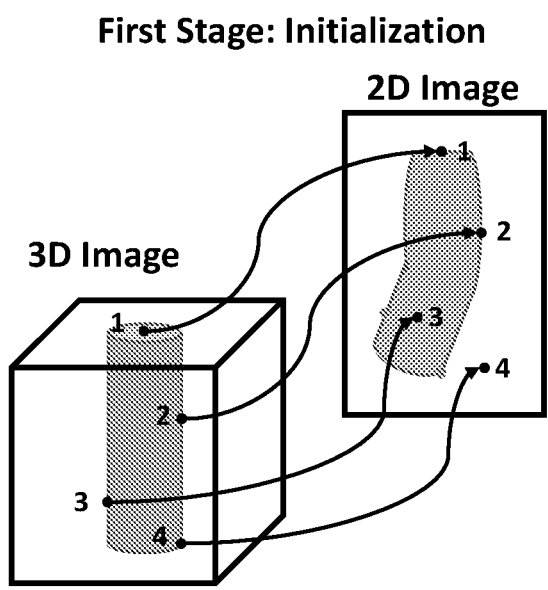
FIGS. 1A and 1B illustrate schematic diagrams of a first stage of registration and subsequent stages of registration, respectively, according to an embodiment of the present invention.

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

An embodiment in accordance with the present invention provides a method to perform 3D-2D registration (for example, registration of 3D CT image data to a 2D radiograph) in a manner that permits deformable motion between structures defined in the 3D image based on a series of locally rigid transformations. Previous solutions provide 3D-2D registration in a manner that is globally rigid—i.e., applies the same transformation to every point in the image. Example applications include overlaying structures of interest annotated in 3D images (e.g., the location of anatomical features of interest in a 3D CT image) onto a single 2D image (e.g., the location of those features in an intraoperative radiograph). Rigid registration is limited in recovering global deformation. The present invention is distinguishable from piecewise rigid registration. In piecewise rigid registration individual rigid bodies are segmented and moved according to the local rigid properties, but with individual pieces moved semi-independently, thereby effecting a globally rigid motion. The multi-stage masking method in the current invention is distinct, because, this invention utilizes predefined annotations in 3D images (e.g., the location of anatomical features of interest) to define regional masks and perform multiple locally rigid registrations that yield improved accuracy in aligning structures that have undergone deformation between the acquisition of the 3D and 2D images (e.g., a preoperative CT compared to an intraoperative radiograph). The 3D image is divided according to volumetric masks defined around the annotations, and the registration at each stage is computed simultaneously for each divided region. Locally-rigid registrations resulting from each divided region constitute a spatially constrained alignment in the mapping of data that corrects for global deformations of the structure(s) of interest. The result is a registration of information from the 3D image to the single 2D image that is globally deformable with respect to the locations of the annotated features (i.e., a different transform is applied to each annotation to account for deformable motion).

The present invention consists of a multi-stage masking approach to intensity-based 3D-2D registration. At the first stage, the entire 3D image is (optionally) masked in a manner that includes all annotations and structures of interest—the same as the previously reported LevelCheck algorithm—and provides initialization to subsequent stages. At each subsequent stage, the images are divided into subregions (which may be spatially distinct or partly overlapping) defined by masks that are generated around subsets of the annotations in the 3D image, to perform multiple, local, rigid registrations, thus minimizing the impact that global deformations may have in a globally rigid registration. This solution is analogous to block-matching, proposed for video motion correction applications and other 2D-2D/3D-3D registration methods. However in this application, rather than arbitrarily dividing the image to perform separate registrations and then combining the outputs to create a deformation field or a single rigid registration, the proposed method defines the subregions (analogous to "blocks") according to masks that are created around the annotations that have been defined in the 3D image, and computes multiple, local, rigid registrations that are accurate within the local region of associated annotations. This can then act as a series of refinements to the rigid 3D-2D registration that are computed in each successive stage and thereby provide improved accuracy without requiring additional user input.

This method differs in several respects from similar methods where annotations are used to perform multiple local registrations or segmentations are needed to account for deformations: (1) The method consists of a multi-stage framework of decomposing the image into subregions to prevent misaligned solutions and to maintain general geometric relationships whereas previous methods immediately break the image into the components that are intended to be registered. (2) The method produces deformable mapping of the annotations whereas previous methods have a rigid output. (3) The method incorporates automatic masking based on the annotations and does not rely on segmentations. The lack of segmentations further distinguishes the present invention from piecewise rigid registration. (4) The method uses intensity-based 3D-2D registration, whereas previous methods rely on extracting features to perform the registration. While intensity based 3D-2D registration is used as an example, any other suitable method known to or conceivable by one of skill in the art could be used.

Proposed Algorithm: Locally-Rigid Intensity-Based 3D-2D Registration Framework

The proposed algorithm of the present invention involves a multi-stage registration process where the basic step at each stage is a set of intensity-based 3D-2D rigid registrations that are defined by sets of regional masks created around the pre-defined annotations within the 3D image. Each registration has a 6 degree-of-freedom (DOF) transformation output consisting of 3 dimensions of translation and 3 dimensions of rotation. Note that while the 6-DOF registration is referred to herein, this is not meant to be considered limiting. The solution extends to other registration geometries (e.g., 9-DOF which additionally solves for an unknown x-ray source position as is the case in mobile radiography, in contrast to a C-arm). The transformation output of this registration is used to map annotations from the 3D image to the 2D image.

The first stage of the algorithm performs the registration using the entire region of interest (or, alternatively, a sufficiently large region for globally accurate rigid registration). This registration will provide an initialization that has an accurate overlap in at least some region of the 2D image, while all regions may not be accurately registered due to global deformation of the structures between the 3D and 2D image.

Figure 1B:
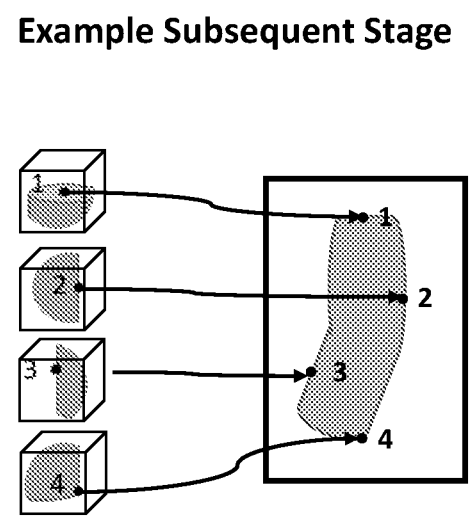

With the 6-DOF transformation output from the first stage, annotations defined in the 3D image can be mapped to the single 2D image; however, accuracy may be impaired due to the aforementioned global deformation of structures in the 2D image, as illustrated in FIGS. 1A and 1B. FIGS. 1A and 1B illustrate schematic diagrams of a first stage of registration and subsequent stages of registration, respectively. To account for these deformations, the multi-stage algorithm uses subsections of images that are defined around subsets of the annotations within the 3D image (volumetric masking) or those projected onto the 2D image (fixed image masking), detailed herein. Separate registrations are then performed for each of these subsections, using the output from previous stages to determine a reasonable initialization. This multi-stage initialization framework decreases the likelihood that the subsections (which contain less information) will be subject to local optima while also preserving the general geometric relationship between the subsections. The final output for the process is then multiple locally accurate rigid 6-DOF transforms to map each annotation separately to the 2D image. As illustrated in FIG. 1, in the first stage, shown on the left, the rigid assumption leads to registration in which annotations 1 and 2 are correctly registered, but the accuracy in mapping for annotations 3 and 4 suffers from deformation that occurred between the 3D and 2D images. In following stages, shown on the right, by breaking the 3D image into multiple sections and using the first stage as an initialization, multiple local registrations can resolve this error in mapping for each location.

Figure 2:
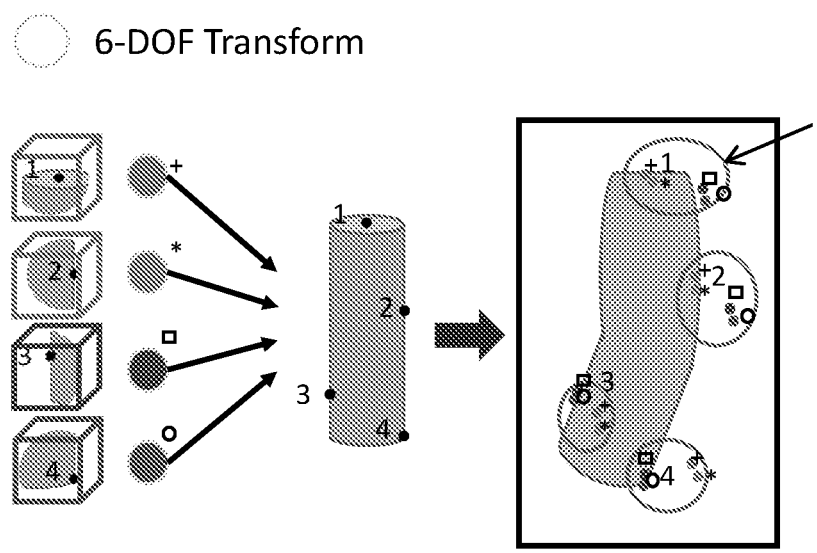
FIG. 2 illustrates a schematic diagram of each of the multiple 6-DOF outputs projecting each of the points contained in the volume to obtain a set of point clouds that may be analyzed to ensure accuracy.

Further, this multi-stage approach provides a rich output of multiple locally-calculated 6-DOF transformations, with which the present invention may leverage various statistical methods to assign a confidence measure for the accuracy in registration at each sub-region to detect and correct failures. This feature becomes increasingly useful as the regions used in registration become smaller due to local masking and therefore contain less information, which may lead to an increased risk of getting stuck in a local optimum. One such approach for this may be to look at the trajectory of projected annotations along subsequent stages to ensure that the location of the annotation converges to a single location, and does not make an unexpected deviation. Another approach may make the assumption that any deformation is relatively smooth and that annotations that are near each other are likely to move in a similar manner. With this assumption, the 6-DOF output from adjacent regions is used to project each label and analyze the point cloud of projected locations to ensure that nearby regions are deforming in a similar manner, as illustrated in FIG. 2. To correct these detected errors the present invention may revert to a previous stage's registration or rely on an adjacent annotation's 6-DOF output.

FIG. 2 illustrates a schematic diagram of each of the multiple 6-DOF outputs projecting each of the points contained in the volume to obtain a set of point clouds that may be analyzed to ensure accuracy. The four 6-DOF outputs (Left) from the local registrations are used to project each label, obtaining a point-cloud for each annotation (Right). This point cloud provides information indicating that the annotations that are near each other (e.g. 3,4 and 1,2) are behaving similarly (in that, for example, the 6-DOF output for annotation 4 projects annotation 3 to a location near 3's output), thus reinforcing the confidence in registration for those regions. Point cloud of annotation 1's projected location using each of the four 6-DOF outputs. Note that, as expected, the projection using the 6-DOF transform for annotation 2 projects to a similar location as annotation 1.

Rigid 3D-2D registration framework has been shown to be robust to many challenges encountered during registration, including some degree of anatomical deformation. In such cases, the registration is accurate in a local region of the image; however, regions distant from that (typically central) local region can exhibit poor alignment. Misalignment at the superior/inferior extremes can diminish utility and confidence. To improve the accuracy of alignment throughout the entire image despite such deformation (e.g., changes in spinal curvature between the CT and radiograph) and to ensure that all annotations are accurately mapped within the vertebral body (even at the distal ends of the radiograph), the present invention includes a multi-stage registration framework. The core feature of the method of the present invention is that the volume is divided into sub-images at each stage to locally refine $T_r$ and correct for any deformation of the spine. Note that the method maintains the advantageous characteristics of the original rigid algorithm, is primarily automatic (i.e., the progression to smaller local regions at each stage does not require additional user input), and is distinct from strictly piece-wise registration (that typically rely on segmentation). Intrinsic to this framework is an increase in computational load (scaling with the number of stages) and a host of additional parameters that must be selected rigorously. The multi-stage framework, including these considerations, is detailed in the following subsections.

The key feature of the method of the present invention is that at each subsequent stage, k, the 3D image is divided into multiple 3D sub-images, each focusing on (possibly overlapping) local regions and are independently registered to p using the outputs from the previous stage ($T_{r;k-1}$) to determine the initialization. The first stage of the framework of the present invention provides an accurate registration in some portion of the image. Then, independent registrations are performed on sub-images of the 3D CT defined based on masked regions about subgroups of vertebral labels. Similarly, in subsequent stages, the sub-images are further divided to focus on smaller, increasingly local 3D regions until the final stage at which the output registration transforms are used to compute annotation locations on the single 2D image. Thus, the multi-stage framework yields a transformation of the annotations from the 3D CT to the 2D radiograph that is globally deformable yet locally rigid to improve the registration accuracy at each annotation.

To divide the CT into sub-images at each stage, subsets of the vertebral labels are used to generate a binary mask around the local region using the principle of binary volumetric masking. Thus, the size of the sub-images at each stage k is determined by $n_k$, the number of labels chosen to generate each mask. The number of stages (S) and the method for choosing which subsets of the annotations are used to generate each sub-image is customizable to a particular case or application scenario and must be investigated to accommodate the expected degree and type of deformation. For each of the S stages, the 3D image is divided into sub-images based on masks that are generated from all adjacent permutations of $n_k$ vertebral labels. At the first stage, $n_1$ is the total number of annotated vertebrae ("All") and is identical to the rigid method; at each subsequent stage the value is reduced to perform registration using smaller sub-images.

3D-2D registration is performed independently for each sub-image in the multi-stage framework. Initialization for each sub-image is determined by the $T_{r;k-1}$ outputs of the previous stage from registrations containing the entire region of the current sub-image. In the scenario where multiple outputs fall into this set, an average over these $N_I$ initialization transformations is used to determine an appropriate initialization. Such an average transformation can be computed by separating the problem into translation and rotation components. For translation, the mean is computed over the input translation components:

$$\overline{T}_{xyz} = \frac{1}{N_I} \sum_{j=1}^{N_I} T_{xyz}^{(j)}$$

Where $T_{xyz}^{(j)}$ is the 3×1 translation vector of the jth $T_R$. For the average rotation, a quaternion average is computed over rotational components to handle the non-linearity of Euler angles. By representing each of the 3×1 rotation vectors as equivalent 4×1 quaternion rotations, $T_{\eta\theta\phi}^{(j)} \rightarrow q_j$, the average of these rotations to be the eigenvector of the matrix M that corresponds to the largest eigenvalue (i.e., $U_1$, the first column of U when S is a decreasing diagonal matrix and $USU^t$ is the eigen-decomposition of M):

$$M = \sum_{j=1}^{N_I} q_j q_j^t = USU^t$$

Following this decomposition, the average quaternion rotation is transformed back into Euler angles, ($U_1 \rightarrow T_{\eta\theta\phi}$) and $T_r = [T_{xyz}', T_{\eta\theta\phi}']^t$ is used to initialize the subsequent registration.

The accuracy is expected to gradually improve as the multi-stage registration progresses, and registration parameters are accordingly adjusted to a finer range and scale. As the transformation estimate approaches the solution at each stage, parameters governing the search range are scaled to better suit the smaller region of interest and improve registration runtime. Such scaling is analogous to a morphological pyramid in which a coarse search over a large search range is refined to a fine search over a smaller search range as the algorithm progresses. In terms of decreasing SR, the parameters of $T_r$ governing the translation direction $z_r$ (corresponding to magnification) and the three rotations were reduced to relatively small empirically-determined fixed values at each stage to cater to the maximum amount of expected deformation. On the other hand, the remaining two translation parameters $x_r$ and $y_r$ (most directly corresponding to [u, v] on the detector) demonstrated greater variability across stages, and thus were reduced in an adaptive manner according to the variation of output poses from the previous stage. The search range, $SR_{x,y}$, for these parameters consisted of the addition of two components: (i) a fraction, $f_k$, of the intervertebral distance (IVD, i.e., the computed mean distance between adjacent vertebral labels on the detector computed from the estimated projected labels of the previous stage); and (ii) an adaptive term, $D_a$, that extends the SR by the standard IVD is selected as a reference based on the finding that registration following stage 1 tends to be accurate within the range of one vertebra; therefore choosing a search range based on IVD allows for a consistent method to constrict the search range (via reducing $f_k$) in a manner that normalizes effects of patient size and vertebra type (i.e. cervical/thoracic/lumbar).

$$SR_{x,y}(f_k) = \frac{z_r}{SDD}(f_k \times IVD + D_a) \text{ where}$$

$$D_a = \sqrt{\frac{1}{n_k N_I}\sum_{i=1}^{n_k}\sum_{j=1}^{N_I}\|d_{ij} - \bar{d}_i\|^2},$$

$$IVD = \frac{1}{(n_k - 1)N_I}\sum_{j=1}^{N_I}\sum_{i=1}^{n_k-1}\|d_{ij} - d_{i+1,j}\|$$

The term $D_a$ is the standard deviation projected labels positions on the detector, $d_{ij}(u, v)$. To compute the standard deviation, the $N_I$ initialization poses, $T_r^{(j)}$, are used to project each of the $n_k$ labels included in the mask for current registration to achieve projected label positions $d_{ij}$ (the projection of label i onto the detector using $T_r^{(j)}$). The standard deviation is then computed by calculating the distance of each label from its centroid location, $\bar{d}_i$ (mean across j of $d_{ij}$). This term is added to the fraction of the IVD (i.e., $f_k \times IVD$) and scaled by the inverse of the current magnification estimate ($z_r/SDD$) to approximate this distance in the CT world coordinates. The search range $SR_{x,y}$ ($f_k$) therefore provides an increasingly smaller search range (by reducing $f_k$ at each stage) that is extended adaptively based on the agreement among the poses in the previous stage. With this smaller SR and an improved initialization estimate, optimization parameters MS and $\lambda$ are able to be relaxed without seeing deteriorating effects in optimization performance. Therefore, to improve computation time and reduce GPU memory, MS and $\lambda$ were reduced to 25 and 100, respectively, before noticeable stochastic effects were observed in the CMA-ES optimizer.

Each stage in the method facilitates finer registration accuracy and exploits increasingly fine detail of anatomical structures in the underlying images. To achieve a finer level of detail, the downsampling of p is reduced (by decreasing $a_{pix}$) along with the kernel width $\sigma$ (characteristic width of the Gaussian smoothing kernel) for the image gradient calculation when computing the metric GO. A parameter sensitivity study which tested 100 variations of $a_{pix}$ and $\sigma$ for stage 1 registration indicated stable performance near 2 mm for both parameters. Following stage 1, the choices for $a_{pix}$ and $\sigma$ were incrementally reduced to the final stage value of 1.5 mm and 1.25 mm, respectively, based on empirical tests in a small number of samples and recognizing limitations in GPU memory (noting that $a_{pix}$ reduction yields a quadratic factor increase in GPU memory use). As a further step to improve memory efficiency, the p image is cropped to contain only the region that is defined by the search range and sub-image extent of the current registration. Following the first stage, adaptive histogram equalization is applied to the radiograph to locally enhance the contrast and thereby accentuate structures that may otherwise fall beneath the gradient threshold applied during GO calculation, an effect that becomes increasingly likely as the impact of noise rises due to the reduction in down-sampling and gradient kernel width.

Exemplary Embodiment of the Algorithm: Improve Accuracy of Annotation Mapping Via 3D-2D Registration During Image-Guided Spinal Interventions An exemplary embodiment for this algorithm is in the setting of image-guided spine interventions, where 3D patient images have been acquired preoperatively and annotated during surgical planning, and intra-procedure 2D images are acquired for guidance to ensure procedural accuracy. This exemplary embodiment is included purely for illustrative purposes and is not meant to be considered limiting. Any suitable implementation known to or conceivable by one of skill in the art could also be used. Mapping pre-operative data from the 3D image to the single 2D image has been shown to be a potentially valuable method for guidance, decision support, and quality assurance during the procedure. For example in the "LevelCheck" algorithm for spine surgery, the vertebral body centroids are annotated in a preoperative CT image, and these annotations are projected onto the intraoperative radiographs to overlay a label for each vertebra at the appropriate location in the radiograph, helping to ensure that the operation is taking place at the correct spinal level.

Global deformation between preoperative 3D imaging and intraoperative 2D acquisitions is a common problem within many image-guided procedures. These deformations are most commonly caused by differences in patient positioning from the preoperative scan to the operating table. For instance, 3D patient images are most often acquired while the patient is supine; however in spinal surgery many operations are performed while the patient is prone. These changes in patient positioning lead to global deformities in anatomy; however, locally, much of the rigid structure is preserved (e.g., the rigidity of individual vertebrae, and the relative local rigidity of segments of the spine spanning a small number of vertebrae).

Figure 3:
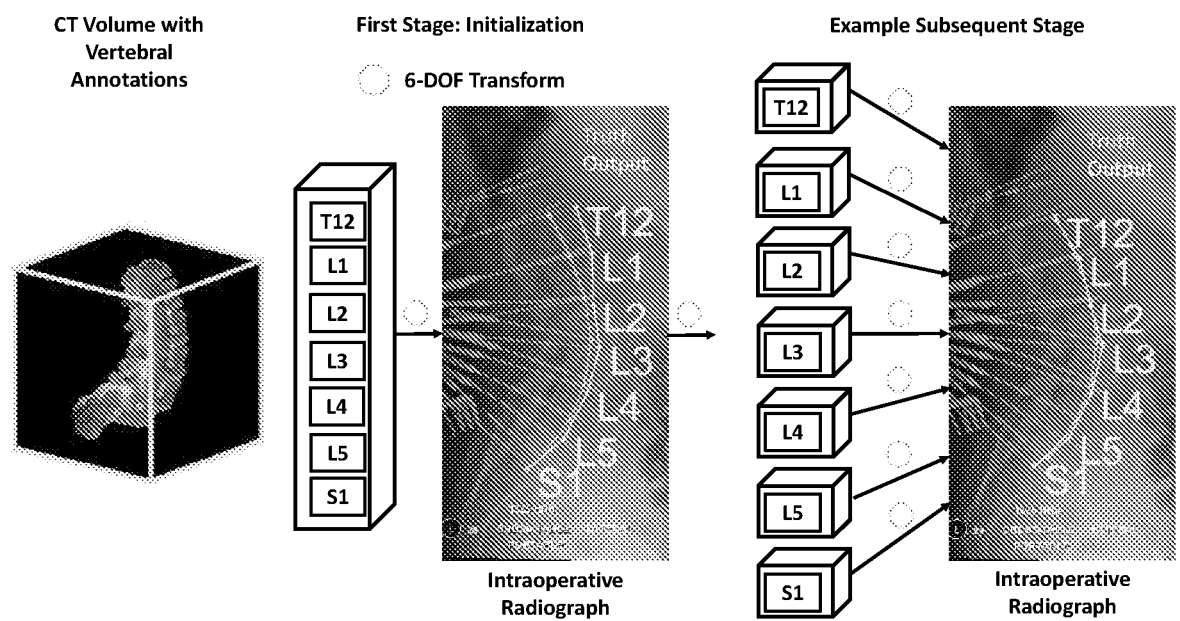
FIG. 3 illustrates a schematic diagram of a registration of a vertebral column, according to an embodiment of the present invention.
Figure 4:
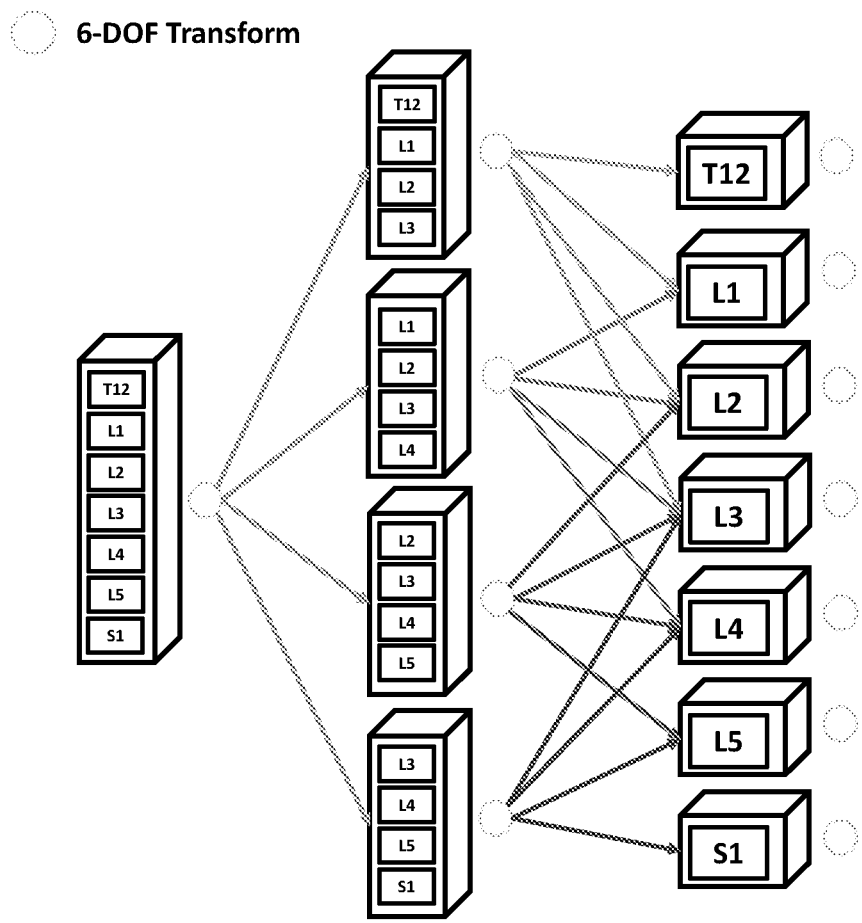
FIG. 4 illustrates a schematic diagram of the original 3D image being separated into 3D subsets of adjacent regions (which may be spatially distinct or partially overlapping), according to an embodiment of the present invention.

Algorithmically, the spinal surgery embodiment could entail a process in which the first stage, the CT (masked along the vertebral column using the annotations) would be rigidly registered to the intraoperative radiograph to ensure some region of accurate overlap. This is the same as the previously described LevelCheck process. Subsequent stages are then comprised of a set of registrations using subsections of the 3D image, where the subsections may be defined by volumetrically masking subsets of adjacent vertebral labels, as illustrated in FIGS. 3 and 4. FIG. 3 illustrates a schematic diagram of a registration of a vertebral column, according to an embodiment of the present invention. FIG. 4 illustrates a schematic diagram of the original 3D image being broken into regional subsets about adjacent vertebral bodies, according to an embodiment of the present invention. The output of the previous registration stage is used to determine the initialization for the subsequent registrations.

The registration output consists of multiple locally rigid transforms that accurately map associated vertebral labels to the single 2D image even in the presence of global deformation. The method allows for many variations in the structure of the multi-stage pyramid, as illustrated in FIGS. 3 and 4. Use of a single stage incorporating the entire 3D image (or a single masked region therein) and a single rigid transformation is the same as the LevelCheck algorithm— and for the method reported here, constitutes the initialization of the locally rigid/globally deformable transformation process. In FIG. 3, an embodiment is illustrated in which the subsequent stage breaks the 3D image into regions about each annotated structure; the multi-stage pyramid is handled in just two stages: initialization, and then N individual rigid registrations. In FIG. 4, the process is illustrated more generally, where a more gradual pyramid of registrations is computed: first, the initialization as described above; then a set of registrations in which the 3D image is fragmented into a number of regions about a subset of annotations; and progressing through the pyramid to a stage in which regions about individual annotations are registered. The structure of the pyramid is flexible and customizable, and increasing the number of levels likely provides more robust performance (but involves more registration calculations).

FIG. 3 illustrates an example of the proposed method in 3D-2D vertebral labeling. (Left) The preoperative 3D CT image annotated with points corresponding to structures of interest (viz., vertebrae). This provides the basis for dividing the 3D image in subsets about each vertebral body to perform a series of locally rigid registrations. In the "First Stage: Initialization" example shown here (which is the same as the LevelCheck algorithm), note the discrepancy between true and registered locations of the points of interest. In the "Example Subsequent Stage," the points are accurately aligned on the radiograph by virtue of individual rigid registrations of masked regions about each annotation point. FIG. 4 illustrates an extension of the method illustrated in FIG. 3 to a multi-stage approach in 3D-2D registration of annotated features. The original 3D image is broken into subsets of adjacent vertebral bodies to allow a series of locally rigid registrations. In FIG. 3 the darker grey line represents truth and the lighter grey line represents the output.

Explanation of 3D-2D Registration Algorithm

Figure 5:
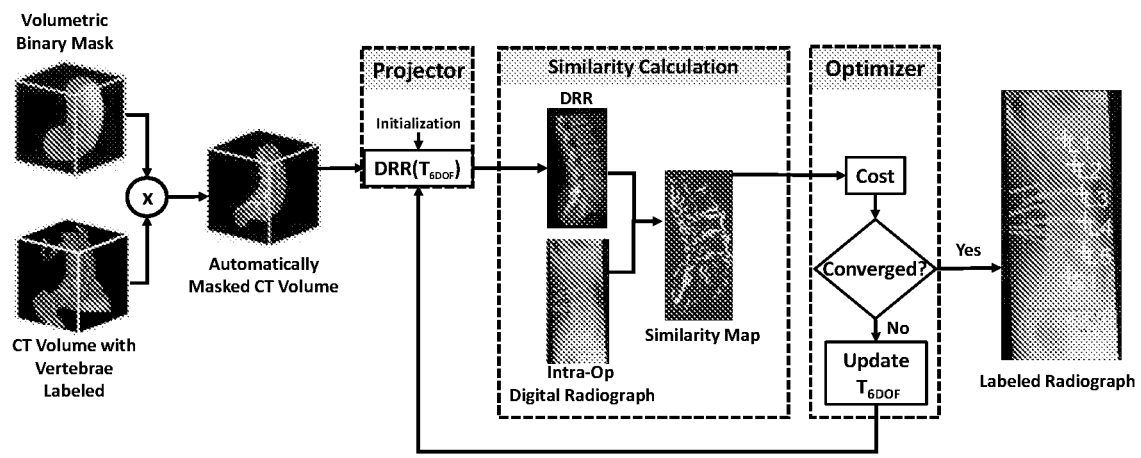
FIG. 5 illustrates a schematic diagram of a 3D-2D registration process in an example embodiment.

This section explains the basic underlying method for 3D-2D image registration with the addition of various "masking" methods that enable the proposed method described above. FIG. 5 illustrates a schematic diagram of a 3D-2D registration process implemented in the LevelCheck algorithm.

Each stage of the proposed algorithm involves at least one execution of 3D-2D registration that uses a masking technique incorporating information from either the annotations in the 3D image (volumetric masking) or the projection of the annotations onto the 2D image (fixed image masking). The registration is accomplished by optimizing an image similarity metric to compute a 6-DOF transform yielding the best match between the single 2D fixed image and a projection of the 3D image defined by a projection geometry that incorporates the 6-DOF parameters of translation and rotation. In the preferred embodiment of registering a 3D image (e.g., a preoperative CT) to a single 2D image (e.g., an intraoperative radiograph), this will include optimizing over the image similarity between the 2D radiograph and the digitally reconstructed radiograph (DRR), which is created by taking a forward projection (defined by camera position and the 6DOF transform) of the CT image.

Additionally, the proposed algorithm specifies the incorporation of masking techniques. Volumetric masking can be accomplished by using two methods each of which takes advantage of the annotations to create an annotation-defined mask that provides greater weight to those regions during registration. The first method involves applying a binary, {0,1}, mask to the 3D volume to zero-out specified voxels, and will be referred to as binary volume masking, as illustrated in FIG. 5. Another possible form of masking, referred to as projection masking, is accomplished by creating a volumetric mask, weighted or non-weighted, and projecting it to form a 2D mask, again weighted or non-weighted, which is applied during similarity calculation. Fixed image masking refers to creating a mask for registration in the fixed 2D image by using the positions of the projected annotations from a registration in a previous stage of the algorithm.

FIG. 5 illustrates an example 3D-2D registration process involving a binary volume mask on the 3D data (e.g., a 3D CT image) with annotations therein, calculating a 2D representation of that image (e.g., a digitally reconstructed radiograph, DRR, computed by forward projection of the 3D CT), calculation of a similarity metric between the 2D representation and the actual 2D image (e.g., calculation of gradient orientation, GO, between the DRR and intraoperative radiograph), iteration by means of an optimization method (e.g., the CMA-ES algorithm), and overlay of annotated data upon the 2D image (e.g., the location of spinal vertebrae as point annotations).

Generality and Other Possible Embodiments

While the examples above primarily refer to applications of vertebral labeling, the proposed method can be generalized to other applications as well, such as:
  Overlaying pedicle screw trajectories on individual vertebrae
  Overlaid labels could be used to calculate degree of spine scoliosis (Cobb angle) or lordosis/kyphosis in the operating room.
  During occipital-spinal fusion, calculate O-C2 angles in the operating room to help predict and prevent dysphagia.
  Anatomical regions containing joints are likely to follow this globally deformable, locally rigid pattern. Thus methods involving extremity imaging can incorporate this framework
  Presumably there are also non-medical applications Elaboration of Exemplary Embodiment During spinal neurosurgery, information such as vertebral labels can be mapped from preoperative 3D CT to intraoperative 2D radiographs via image-based 3D-2D registration. Such registration has been shown to provide a potentially valuable means of decision support in target localization as well as quality assurance of the surgical product. However, robust registration can be challenged by mismatch in image content between the preoperative CT and intraoperative radiographs, arising, for example, from anatomical deformation or the presence of surgical tools within the radiograph. The present invention is also directed to methods for automatically mitigating the effect of content mismatch by leveraging the surgical planning data to assign greater weight to anatomical regions known to be reliable for registration and vital to the surgical task while removing problematic regions that are highly deformable or often occluded by surgical tools. Two approaches are possible to assigning variable weight (i.e., "masking") to image content and/or the similarity metric: (1) masking the preoperative 3D CT; and (2) masking within the 2D similarity metric calculation. The accuracy of registration was evaluated in 61 cases of an IRB-approved clinical study using projection distance error (PDE). The best performing of the masking techniques was found to reduce the rate of gross failure (PDE>20 mm) from 12.46% to 5.25%. These approaches provided robustness to content mismatch and eliminated distinct failure modes of registration. Such improvement was gained without additional workflow and has motivated incorporation of the masking methods within a system under development for prospective clinical studies.

The following elaborates on the exemplary implementation of the invention. This implementation is not meant to be considered limiting and is included as an illustration of the present invention. As noted above, intraoperative imaging plays a vital role in target localization and verification of the surgical product in spine surgery. For example, intraoperative digital radiographs (DR) are commonly acquired in both open and minimally invasive approaches to assist the surgeon in localization and guidance. Despite such practice, wrong-level surgery occurs at unacceptable frequency, constituting the second-most common form of surgical site error and with up to 50% of neurosurgeons claiming (self-reported) wrong-level surgeries. Accordingly, surgeons go to great lengths to avoid such a "never event," including meticulous (manual) level counting and even preoperative tagging of the surgical target under CT guidance—each costing time, expense, and stress. Recent work has advanced a system to map preoperatively annotated vertebral labels from preoperative 3D CT imaging to intraoperative 2D DR via image-based 3D-2D registration, providing a potentially valuable means of decision support. In challenging cases, however, robust registration can be confounded due to content mismatch between the CT and the DR, particularly due to anatomical deformation and the presence of extraneous surgical tools. To overcome the challenges caused by such mismatch, manually delineated masks have been previously applied to the intraoperative DR to constrain the region of interest and exclude surgical tool gradients. However, these masks are time consuming, subject to user variability, and complicate workflow by requiring additional user input. In the work reported below, an alternative approach that automatically masks the preoperative CT and/or projection domain similarity calculation is used by leveraging information already defined in preoperative CT in the course of surgical planning. The method is tested in particularly challenging clinical scenarios drawn from an ongoing clinical study.

To aid the surgeon during intraoperative localization, vertebral levels identified in the preoperative CT image are projected onto the intraoperative DR via 3D-2D registration. During registration, image similarity between the intraoperative radiograph and a digitally reconstructed radiograph (DRR), formed by projecting the preoperative CT image, was optimized in a rigid 6 degree of freedom (DoF) transformation space.

Figure 6:
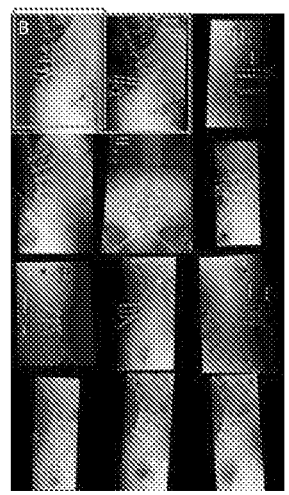
FIG. 6 illustrates an image view of exemplary radiographs illustrating challenging content mismatch arising from anatomical deformation and the presence of surgical tools.

Multi-start covariance matrix adaptation-evolution strategy (CMA-ES) was used to optimize the 6 DoF space consisting of 3 translation (x, y, z) and 3 rotation (η, θ, ϕ) parameters, embedded in the projective transformation matrix denoted by $T_{3\times4}$. Simultaneous searches were performed after initializing at 50 multi-start locations, distributed within a range of (±50, ±100, ±200) mm and (±10, ±10, ±10) degrees in the 6 DoF space. Gradient Orientation (GO) was used as the similarity metric. To permit fast registration consistent with intraoperative workflow, DRR generation and similarity metric computations were parallelized on GPU. As pre-processing steps, a soft-tissue threshold of 175 HU was applied to the CT to remove low-density gradients, and a rectangular region was defined on the radiographs to remove areas containing collimation and burnt-in text annotations. Image orientations were initialized with the CT image simply translated in the longitudinal direction of the patient to ensure initial overlap between the radiograph and the DRRs (with registration error following basic initialization ~20-200 mm), as illustrated in FIG. 5. FIG. 6 illustrates an image view of exemplary radiographs illustrating challenging content mismatch arising from anatomical deformation and the presence of surgical tools. Two particularly challenging cases are marked with light grey boxes, which defy registration without the proposed masking.

Figures 7A, 7B, 7C, 7D, 7E, 7F, 7G:
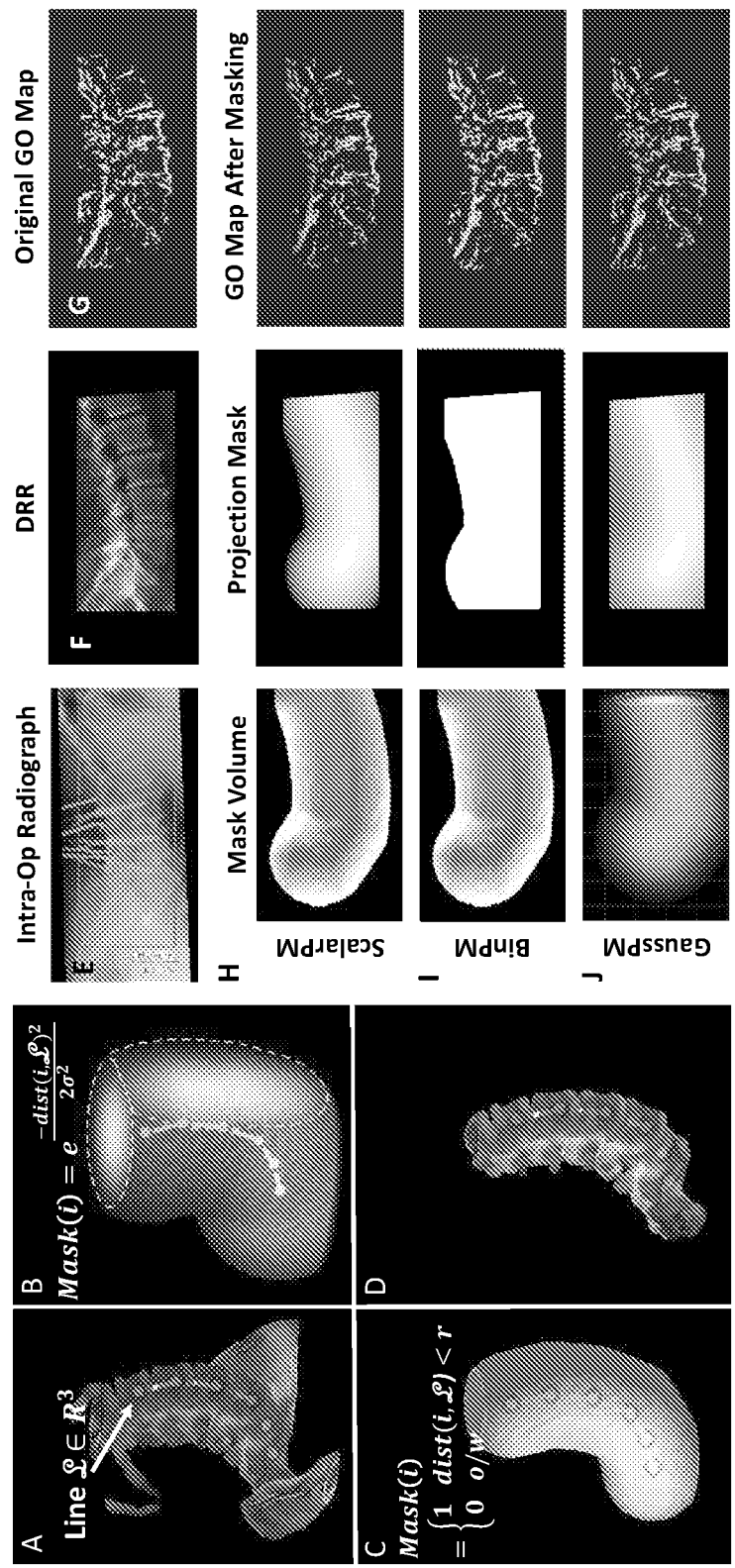

To emphasize the anatomical region of interest in registration, a volumetric mask was automatically created centered on the vertebrae locations already defined in preoperative CT images. Note that such definition can be performed automatically (e.g., using the method and is a planning step consistent with conventional preoperative workflow. To identify an optimal method for applying masks within the registration framework, multiple approaches to masking were investigated and compared their performance. As the initial step, the vertebrae centroids were connected to form a 3D line skeleton L of FIG. 7A that is used to compute two different types of volumetric masks with only one input parameter—the mask width. The first is a 3 dimensional Gaussian of FIG. 7B centered along the line L with Gaussian width σ. The second is a binary (0 or 1) mask centered on L with radius r of FIG. 7C. These two volumetric masks were used in two different masking implementations, detailed below. FIGS. 7A-7J illustrate image views of an exemplary implementation of the present invention. Further FIGS. 7A-7J illustrate image views of volumetric Masking and Projection Masking. FIG. 7A illustrates a preoperative CT with the vertebral levels labeled during preoperative planning. The line $\mathcal{L}$ interpolates the locations of the vertebral levels and forms the basis for masking. FIG. 7B illustrates a mask centered on $\mathcal{L}$ with Gaussian width 50 mm. FIG. 7C illustrates a binary mask created about $\mathcal{L}$, with width 50 mm. FIG. 7D illustrates the CT image after binary masking. FIG. 7E illustrates an intraoperative radiograph. FIG. 7F illustrates a DRR of the CT at solution. FIG. 7G illustrates a GO similarity map at solution. FIGS. 7H-7J illustrate volumetric masks, their corresponding projection masks, and the resulting GO map following (H) ScalarPM, (I) BinPM, and (J) GaussPM.

$$\text{Gaussian Mask}(i) = e^{\frac{-dist(i,L)^2}{2\sigma^2}} \quad \text{Binary Mask}(i) == \begin{cases} 1 & dist(i, L) < r \\ 0 & o/w \end{cases}$$

In Binary Volume Masking (BinVM), masking is applied directly to the CT volume. In this approach, the binary mask is applied to the original CT to emphasize the region that is most relevant to the surgery and eliminate sensitivity to anatomical regions distal to the surgical target, such as the pelvis, which can impair registration, as illustrated in FIGS. 7C and 7D. The mask is applied once in the initial step, such that the registration optimization loop is unaltered.

Projection masking aims to provide greater weight to vertebral regions during the similarity metric computation step of the registration. The similarity map consists of pixel-wise contributions to similarity between the DRR and the intraoperative DR [GO(x,y)], prior to summation to compute the overall metric value [GO]. By using the same $T_{3\times4}$ that generated the DRR, the volumetric mask can be forward projected to generate a projection mask applied to the similarity map, giving greater weight to the vertebral region. With the two types of volumetric mask defined above, three variations of projection mask are defined: (1) scalar projection masking (ScalarPM), in which the binary mask is projected in FIG. 7H; (2) binary projection masking (BinPM), in which the mask weight is set to 1 if the projector passes through the binary volume as in FIG. 7I; and (3) Gaussian projection masking (GaussPM), in which the projection of the Gaussian mask is used as the weight for the similarity map as in FIG. 7J.

Analysis was performed under an IRB-approved retrospective study to evaluate registration performance in a clinical data set (24 cases, yielding 24 CT images and 61 radiographs) for individuals undergoing thoracolumbar spine surgery. To focus specifically on challenging cases that tend to confound 3D-2D registration ("failure modes"), 17 radiographs that exhibited registration failure were identified as "challenging"—and were analyzed separately to examine robustness of the proposed approach and then pooled with the 61 radiographs to ensure that the proposed method did not diminish overall performance within the cohort as a whole.

Comparisons among the four masks (BinVM, ScalarPM, BinVM, and GaussPM) with respect to "No Masking" were carried out among the challenging subset of 17 radiographs. For each radiograph and masking technique, registration was repeated at each mask width 5 times (noting small, arguably negligible stochasticity in CMA-ES in the current data). Following this analysis, the performance of each mask (at optimal width) was then verified on the entire dataset (61 radiographs). For the experiments throughout, registration accuracy was evaluated using projection distance error (PDE), measuring the distance between the projected labels and manually identified ("true") vertebral centroids. Gross failure was defined as PDE>20 mm—a threshold reflecting the approximate distance of half of a thoracolumbar vertebral body (at the detector, assuming a conventional magnification factor of 2). To determine statistical significance, p-values were computed under the null hypothesis that the binomial parameter (fraction with PDE>20) for a specified mask scenario is greater than or equal to that of the "No Mask" scenario.

Following the experiments detailed above, volumetric masks were generated with the number of vertebrae labeled in preoperative CT ranging from 7 down to 5, 3, and 1. This study was motivated in part by the desire to reduce the length of preoperative CT scans (a direct multiplier in dose-length product and effective dose), to minimize the amount of preoperative data required for the registration process, and to examine the accuracy of registration where only a small region is considered important. The (binary or Gaussian) mask was still defined automatically as in Eq. (1), noting that in the case of 1 vertebrae, the 3D mask amounts simply to a binary or Gaussian "sphere" (of width characterized by $\sigma$ or r, respectively) about the target level.

Figures 8A, 8B:
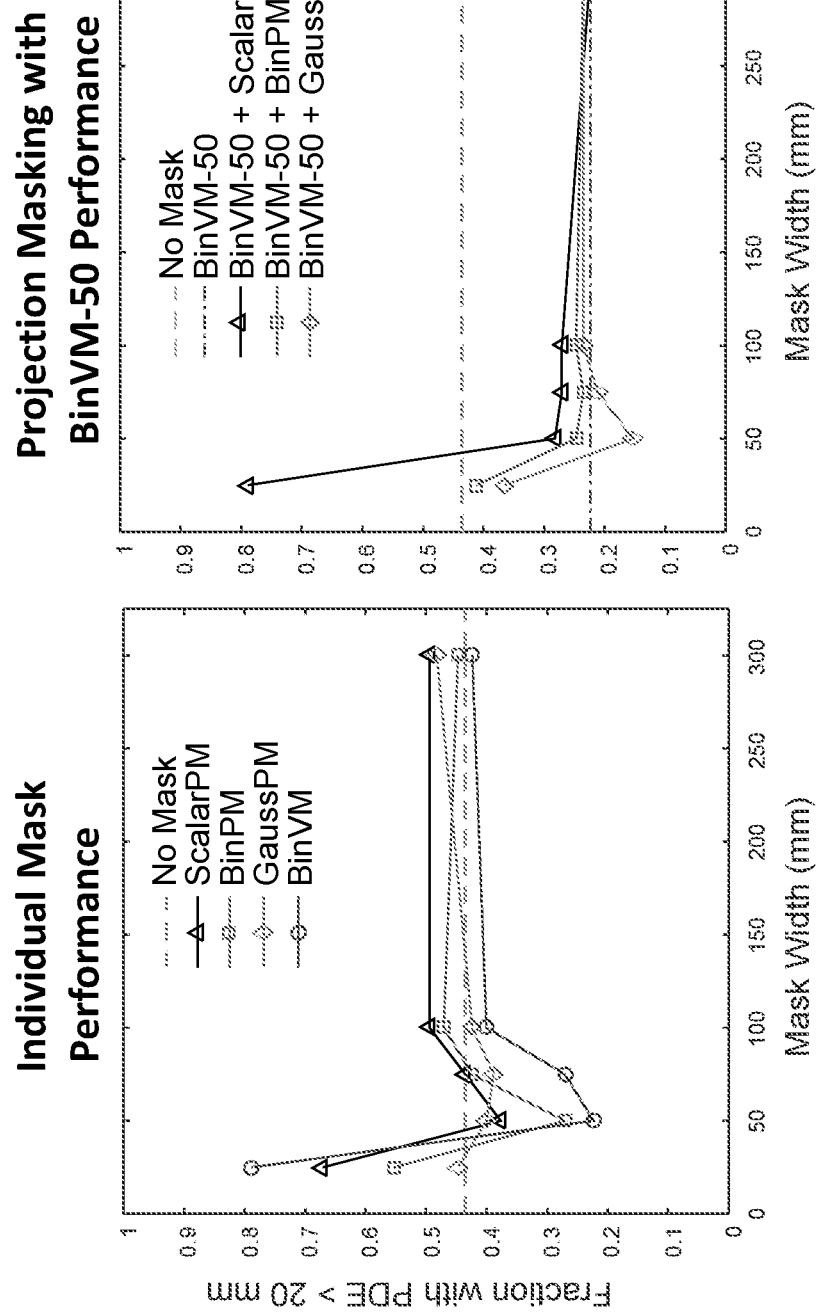
FIGS. 8A and 8B illustrate graphical views of an evaluation of mask performance in the "challenging" subset of clinical studies that tend to confound registration.

FIG. 8A shows the performance of the four mask types described above, applied to the challenging subset of 17 radiographs. BinVM with r=50 mm (denoted BinVM-50) provided the most effective single mask and improved registration performance by rectifying approximately half of the challenging cases (from 43.5% gross error in the "No Mask" case to 22.3% error with BinVM-50, p-value <0.001). As shown in FIG. 8B, further improvements could be obtained when projection masking was combined with BinVM-50, with the best overall performance demonstrated by BinVM-50 with GaussPM with $\sigma$=50 mm (denoted GaussPM-50), reducing the failure rate to 15.3% (p-value <0.001, compared to "No Mask"). This improvement was maintained when applied to the full cohort of 61 radiographs, wherein the "No Mask" method exhibited 12.46% failure rate, reduced to 6.89% for BinVM-50 and 5.25% for BinVM-50+GaussPM-50.

FIGS. 8A and 8B illustrate graphical views of an evaluation of mask performance in the "challenging" subset of clinical studies that tend to confound registration. FIG. 8A illustrates an individual masks at various widths. FIG. 8B illustrates the BinVM-50 Mask combined with the ScalarPM, BinPM, and GaussPM masks. The Binary Volume mask (optionally combined with a Gaussian Projection mask) provided robustness in challenging cases with strong deformation and high density of surgical implants.

Figures 9A, 9B:
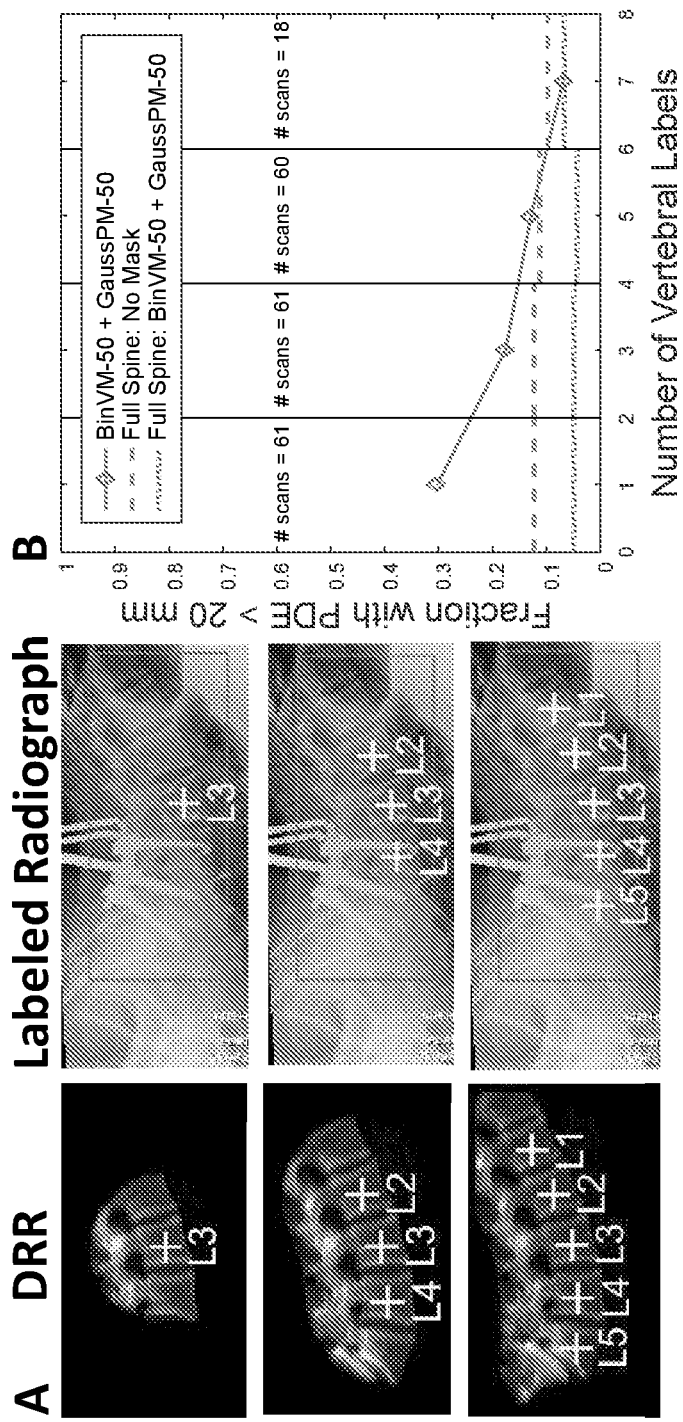
FIGS. 9A and 9B illustrate image views of analysis of sensitivity to the number of vertebrae included in the mask.

FIGS. 9A and 9B show the effect of the number of vertebrae used in mask definition, where gradual improvement in performance was observed when using an increased number of defined levels. The results indicate that including ~7 levels in mask creation was required to match the performance achieved when using the entire spine, indicating the necessity for using a multistage framework to maintain robustness when breaking the image into subsections. FIGS. 9A and 9B illustrate image views of analysis of sensitivity to the number of vertebrae included in the mask. FIG. 9A illustrates examples of using BinVM-50+ GaussPM-50 masks with 1, 3, and 5 vertebrae. FIG. 9B illustrates a fraction of cases demonstrating gross registration error analyzed as a function of the number of vertebra included in the mask. Baseline values are shown as dotted lines.

The ability to quickly and accurately augment intraoperative radiographs with registered vertebral levels offers a potentially valuable means of decision support against wrong-level surgery, and the methods for automatic masking established in this work were shown to successfully mitigate distinct failure modes that can confound registration. This increased robustness in registration comes with no additional manual steps and was essential to reliable registration in challenging cases of strong anatomical deformation and instances of high implant density in the intraoperative scene. Automatic masking, particularly BinVM-50+GaussPM-50, improved registration accuracy and reduced the failure rate in challenging cases without diminishing performance in the general cohort. These results motivate incorporation of automatic masking in the registration system now in translation to prospective clinical studies.

It should be noted that the methods of the present invention described above can be implemented with a computing device. The computing device can be hard wired to the imaging machine or can be networked in a wired or wireless manner. The computing device can also communicate with a server or other remote computing device in order to execute these steps. A non-transitory computer readable medium programmed to execute the methods can be loaded on the computing device or in communication with the computing device. The non-transitory computer readable medium can take any suitable form known to one of skill in the art. The non-transitory computer readable medium is understood to be any article of manufacture readable by a computer or other computing device. Such non-transitory computer readable media includes, but is not limited to, magnetic media, such as floppy disk, flexible disk, hard, disk, reel-to-reel tape, cartridge tape, cassette tapes or cards, optical media such as CD-ROM, DVD, blu-ray, writable compact discs, magneto-optical media in disc, tape, or card form, and paper media such as punch cards or paper tape. Alternately, the program for executing the method and algorithms of the present invention can reside on a remote server or other networked device. The computing device can take the form of a PC, tablet, smartphone, processor, or any other suitable computing device known to or conceivable by one of skill in the art.

The program can also exist on a specially designed computer built with the specifications of the present invention in mind. The computing device is also configured to receive information from both a source of 3D image data and a source of 2D image data. The computing device should be configured for processing the registrations in real-time and also intraoperatively. Data can be transmitted from the imaging device or image database wirelessly, over a network, with storage media, or any other suitable means known to or conceivable to one of skill in the art.

The computing device can be a special computer designed specifically for this purpose. The computing device can be unique to the present invention and designed specifically to carry out the method of the present invention. Scanners generally have a console which is a proprietary master control center of the scanner designed specifically to carry out the operations of the scanner and receive the imaging data created by the scanner. Typically, this console is made up of a specialized computer, custom keyboard, and multiple monitors. There can be two different types of control consoles, one used by the scanner operator and the other used by the physician. The operator's console controls such variables as the thickness of the image, the amount of tube current/voltage, mechanical movement of the patient table and other radiographic technique factors. The physician's viewing console allows viewing of the images without interfering with the normal scanner operation. This console is capable of rudimentary image analysis. The operating console computer is a non-generic computer specifically designed by the scanner manufacturer for bilateral (input output) communication with the scanner. It is not a standard business or personal computer that can be purchased at a local store. Additionally this console computer carries out communications with the scanner through the execution of proprietary custom built software that is designed and written by the scanner manufacturer for the computer hardware to specifically operate the scanner hardware.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of registering three-dimensional (3D) image data to two-dimensional (2D) image data, comprising:
    receiving a 3D dataset, a 2D dataset, and a plurality of annotations that are associated with a first plurality of features in the 3D image data;
    defining a plurality of volumetric masks in the 3D dataset using the plurality of annotations;
    applying each volumetric mask to the 3D dataset to generate a first plurality of 3D subsets of the 3D dataset;
    for each 3D subset, performing a separate locally-rigid registration of the 3D subset to the 2D dataset to generate a second plurality of 3D subsets; and
    based on the second plurality of 3D subsets, associating the plurality of annotations with a second plurality of features in the 2D image data.

2. The method of claim 1, wherein at least two of the volumetric masks are partially overlapping.

3. The method of claim 1, wherein performing the locally-rigid registration of each 3D subset to the 2D subset comprises performing an intensity-based 3D-2D rigid registration.

4. The method of claim 1, further comprising performing an initial globally-rigid registration of the 3D dataset to the 2D dataset, to generate a modified 3D dataset, wherein applying each volumetric mask to the 3D dataset comprises applying each volumetric mask to the modified 3D dataset.

5. The method of claim 1, wherein the first plurality of features in the 3D image data are anatomical features, and the second plurality of features in the 2D image data are anatomical features that correspond to the first plurality of features.

6. The method of claim 1, wherein the 3D image data comprises one of computed tomography image data and magnetic resonance imaging (MRI) image data.

7. The method of claim 1, wherein the 2D image data comprises a radiograph.

8. The method of claim 1, wherein the 3D image data is preoperative image data and the 2D image data is intraoperative image data.

9. The method of claim 1, further comprising displaying on a display, the 2D image data with the plurality of annotations associated with the second plurality of features.

10. The method of claim 1, wherein performing the locally-rigid registration of each 3D subset to the 2D subset comprises generating a transformation associated with each 3D subset.

11. The method of claim 10, wherein the transformation is a 6 degree-of-freedom (DOF) transformation comprising three dimensions of translation and three dimensions of rotation.

12. The method of claim 10, wherein the transformation is a 9 degree-of-freedom (DOF) transformation comprising three dimensions of translation, three dimensions of rotation, and three dimensions corresponding to a position of an x-ray source used to generate the 2D image data.

13. A system for registering three-dimensional (3D) image data to two-dimensional (2D) image data, comprising:
    a first image scanner configured to provide a 3D dataset;
    a second image scanner configured to provide a 2D dataset; and
    a processor configured to:
    receive, from the first image scanner, the 3D dataset;
    receive, from the second image scanner, the 2D dataset;
    receive a plurality of annotations that are associated with a first plurality of features in the 3D image data;
    define a plurality of volumetric masks in the 3D dataset using the plurality of annotations;
    apply each volumetric mask to the 3D dataset to generate a first plurality of 3D subsets of the 3D dataset;
    for each 3D subset, perform a separate locally-rigid registration of the 3D subset to the 2D dataset to generate a second plurality of 3D subsets; and
    based on the second plurality of 3D subsets, associate the plurality of annotations with a second plurality of features in the 2D image data.

14. The system of claim 13, wherein at least two of the volumetric masks are partially overlapping.

15. The system of claim 13, wherein performing the locally-rigid registration of each 3D subset to the 2D subset comprises performing an intensity-based 3D-2D rigid registration.

16. The system of claim 13, further comprising performing an initial globally-rigid registration of the 3D dataset to the 2D dataset, to generate a modified 3D dataset, wherein applying each volumetric mask to the 3D dataset comprises applying each volumetric mask to the modified 3D dataset.

17. The system of claim 13, wherein the first plurality of features in the 3D image data are anatomical features, and the second plurality of features in the 2D image data are anatomical features that correspond to the first plurality of features.

18. The system of claim 13, wherein the 3D image data comprises one of computed tomography image data and magnetic resonance imaging (MRI) image data.

19. The system of claim 13, wherein the 2D image data comprises a radiograph.

20. The system of claim 13, wherein the 3D image data is preoperative image data and the 2D image data is intraoperative image data.

21. The system of claim 13, further comprising displaying on a display, the 2D image data with the plurality of annotations associated with the second plurality of features.

22. The system of claim 13, wherein performing the locally-rigid registration of each 3D subset to the 2D subset comprises generating a transformation associated with each 3D subset.

23. The system of claim 22, wherein the transformation is a 6 degree-of-freedom (DOF) transformation comprising three dimensions of translation and three dimensions of rotation.

24. The system of claim 22, wherein the transformation is a 9 degree-of-freedom (DOF) transformation comprising three dimensions of translation, three dimensions of rotation, and three dimensions corresponding to a position of an x-ray source used to generate the 2D image data.

* * * * *